(12) United States Patent
Klabunde

(10) Patent No.: US 6,385,897 B1
(45) Date of Patent: May 14, 2002

(54) ICE FISHING CASE

(76) Inventor: Brett M. Klabunde, 10956 S. Sunset Dr., Brownton, MN (US) 55312

( * ) Notice: Subject to any disclaimer, the term of this patent is extended or adjusted under 35 U.S.C. 154(b) by 0 days.

(21) Appl. No.: 09/614,977

(22) Filed: Jul. 12, 2000

(51) Int. Cl.⁷ .............................................. A01K 97/00
(52) U.S. Cl. ............................ 43/54.1; 43/26; 43/57.1; 224/920
(58) Field of Search .................. 43/54.1, 26, 57.1; 312/241; 190/12 R, 12 A, 51; 206/314, 37, 5, 14; 150/52 J; 217/7; 224/920

(56) References Cited

U.S. PATENT DOCUMENTS

| | | | |
|---|---|---|---|
| 952,314 A | * | 3/1910 | Ellsworth |
| 1,827,929 A | * | 10/1931 | Bigelow |
| 2,669,641 A | * | 2/1954 | Becker |
| 2,948,080 A | * | 8/1960 | Hawley |
| 3,310,905 A | * | 3/1967 | Davis et al. |
| 3,758,977 A | * | 9/1973 | Miller ........................ 43/57.5 |
| 4,093,010 A | | 6/1978 | Hunley et al. |
| 4,106,597 A | * | 8/1978 | Shook et al. .................. 190/42 |
| 4,176,491 A | * | 12/1979 | Herring ........................ 43/57.5 |
| 4,306,601 A | | 12/1981 | Wallis et al. |
| 4,446,900 A | | 5/1984 | Markovich |
| D279,623 S | | 7/1985 | Blomquist et al. |
| 4,770,327 A | * | 9/1988 | Fortson .................... 224/42.01 |
| 4,852,293 A | * | 8/1989 | Levine et al. ................. 43/54.1 |
| 4,890,414 A | * | 1/1990 | Bridenthal et al. ........... 43/54.1 |
| 5,042,193 A | * | 8/1991 | Streiner ........................ 43/54.1 |
| D339,233 S | * | 9/1993 | Patrick ........................... D3/76 |
| 5,319,874 A | | 6/1994 | Vance |
| D389,306 S | | 1/1998 | McPherson |
| 5,899,420 A | * | 5/1999 | Gerardi ........................ 248/146 |
| 6,241,090 B1 | * | 6/2001 | Kaplinsky .............. 206/315.11 |

* cited by examiner

*Primary Examiner*—Charles T. Jordan
*Assistant Examiner*—Andrea M Valenti
(74) *Attorney, Agent, or Firm*—Dale J. Ream

(57) ABSTRACT

A case for storing and carrying ice fishing equipment and related tackle comprises a bottom portion having a bottom panel, upwardly extending front, rear, and end walls which define a bottom portion cavity. The case further includes a top portion having a top panel, downwardly extending front, rear, and end walls which define a top portion cavity. The top and bottom portions are pivotally coupled along the rear walls thereof, respectively, such that the portions are movable between open and closed configurations. Each cavity is substantially occupied by a foam insert which defines a plurality of compartments. The case further includes a partition pivotally mounted between the top and bottom portions. When the top and bottom portions are in an open configuration, the partition is selectively movable between a first position parallel to the bottom panel and seated upon a respective foam insert and a second position parallel to the top panel and seated upon the other foam insert. The outer surface of the top panel includes a pair of spaced apart recesses for hanging the case on a wall for storage or for use as a work surface.

6 Claims, 8 Drawing Sheets

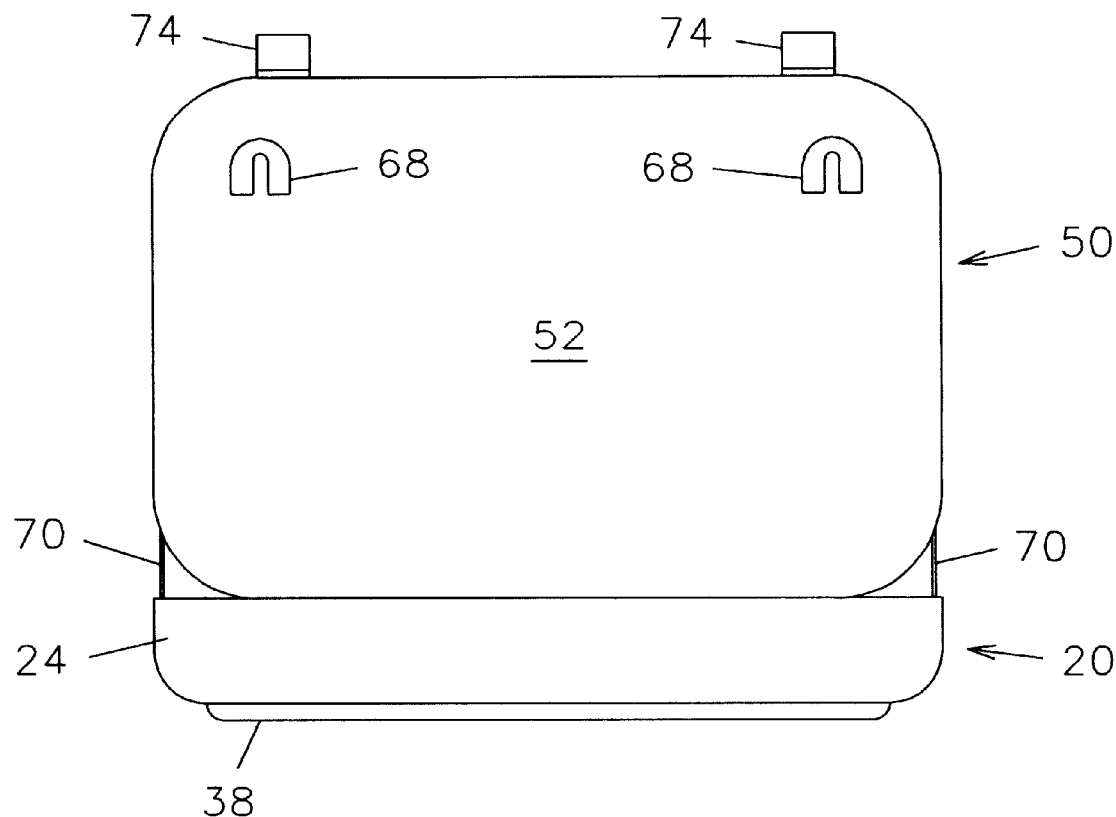

ICE FISHING CASE

BACKGROUND OF THE INVENTION

This invention relates generally to carrying cases and, more particularly, to a case for carrying and storing ice fishing equipment and related tackle as well as providing an elevated work surface.

Unique types of fishing equipment and tackle are utilized for ice fishing, such as a tip-up, jig pole, and related tackle. Further, this equipment is often used within an ice fishing shack that is actually positioned on the ice covering a body of water during the winter months in cold climates. Several carrying cases have been proposed in the art for carrying fishing equipment to and from a fishing location. Although assumably effective for their intended purposes, the existing devices do not provide for the secure storage of equipment and tackle in both bottom and top portions of the case. Further, existing devices do not provide both a storage container and a work surface.

Therefore, it is desirable to have a case in which both top and bottom portions define a plurality of compartments for storing ice fishing equipment and related tackle. Further, it is desirable to have a case in which a partition precludes the passage of water between the bottom and top portions as well as selectively providing a work surface. It is also desirable to have a case which can be mounted to a wall at a selected elevation.

SUMMARY OF THE INVENTION

A carrying and storage case for ice fishing equipment and related tackle according to the present invention includes top and bottom portions pivotally coupled together, each portion forming a cavity. Foam rubber inserts occupy substantial portions of each respective cavity and define a plurality of compartments suitable for holding ice fishing equipment, such as a tip-up, jig pole, and conventional tackle. Each insert flexibly deforms as it receives equipment or other tackle therein and holds it securely as the foam rebounds to its original shape. The case further includes a rigid partition pivotally mounted between the top and bottom portions. When the top and bottom portions are in an open configuration, the partition is selectively movable between a first position parallel to the bottom panel and seated upon a respective foam insert and a second position parallel to the top panel and seated upon the other foam insert. Therefore, the partition serves as a work area at its first position. The outer surface of the top panel includes a pair of spaced apart recesses for hanging the case on a wall for storage or for use as a work surface. Optionally, the outer surface of the top panel may include a pair of brackets for wall mounting.

Therefore, a general object of this invention is to provide a case for storing and carrying ice fishing equipment and related tackle.

Another object of this invention is to provide a case, as aforesaid, which can be mounted at a selected position upon a wall for storage or for use as a work area.

Still another object of this invention is to provide a case, as aforesaid, in which top and bottom portions are selectively movable between open and closed configurations.

Yet another object of this invention is to provide a case, as aforesaid, having foam inserts forming multiple compartments for securely holding fishing equipment and tackle.

A further object of this invention is to provide a case, as aforesaid, having a rigid exterior surface that is durable.

A still further object of this invention is to provide a case, as aforesaid, having a partition pivotally mounted between top and bottom portions for selectively providing a work surface or for preventing the passage of water between portions.

Other objects and advantages of this invention will become apparent from the following description taken in connection with the accompanying drawings, wherein is set forth by way of illustration and example, an embodiment of this invention.

BRIEF DESCRIPTION OF THE DRAWINGS

FIG. 8a is a rear view of a case according to an alternative embodiment of the invention;

FIG. 8b is a front view of a hanger bracket as in FIG. 8a; and

FIG. 8c is a sectional view taken along line 8c—8c of FIG. 8b.

DESCRIPTION OF THE PREFERRED EMBODIMENT

A case 10 for storing and carrying ice fishing equipment and related tackle according to a preferred embodiment of the present invention will now be described with reference to FIGS. 1–7 of the accompanying drawings.

Figure 1:
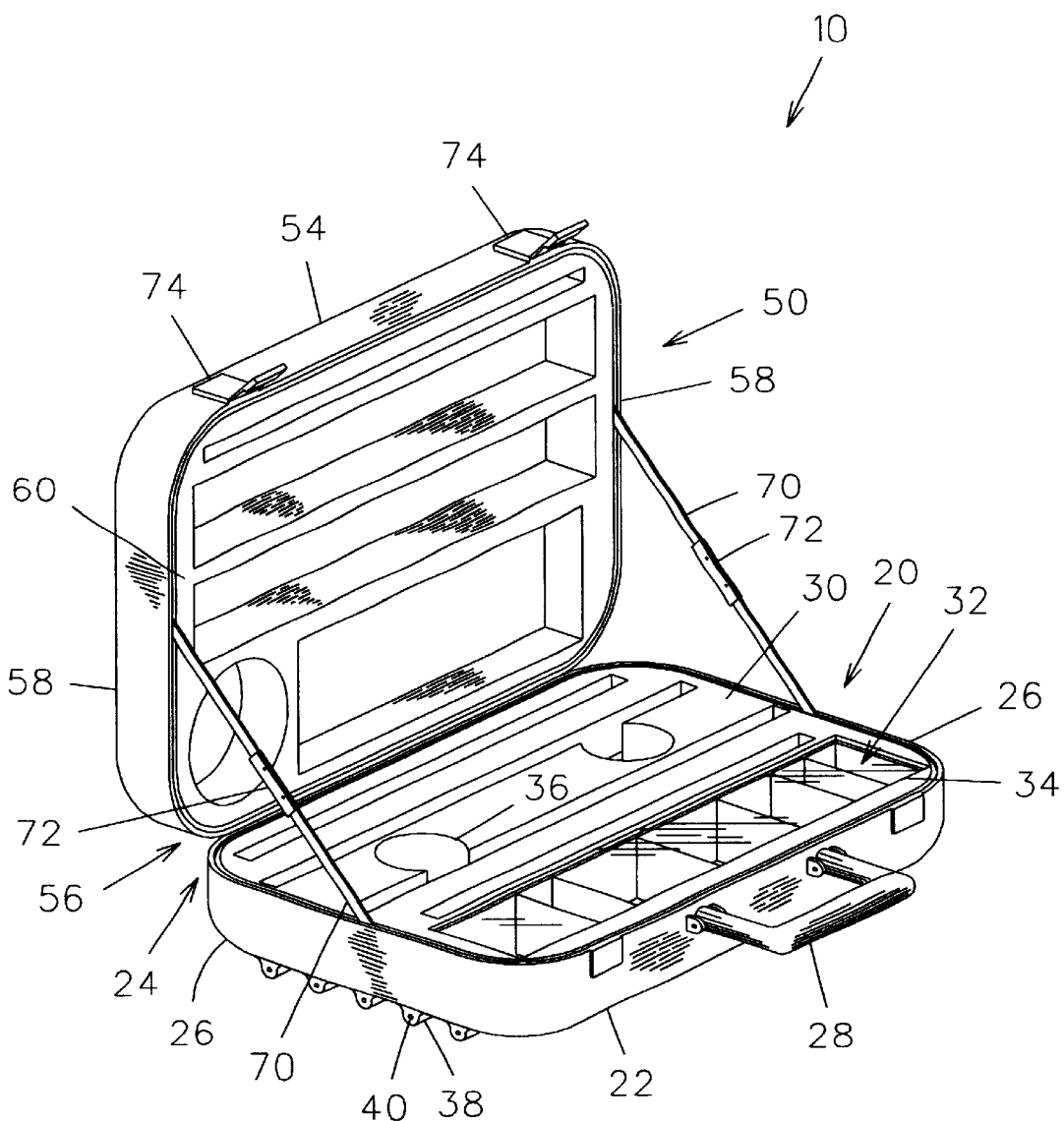
FIG. 1 is a perspective view of a case in an open configuration according to a preferred embodiment of the invention.
Figure 2:
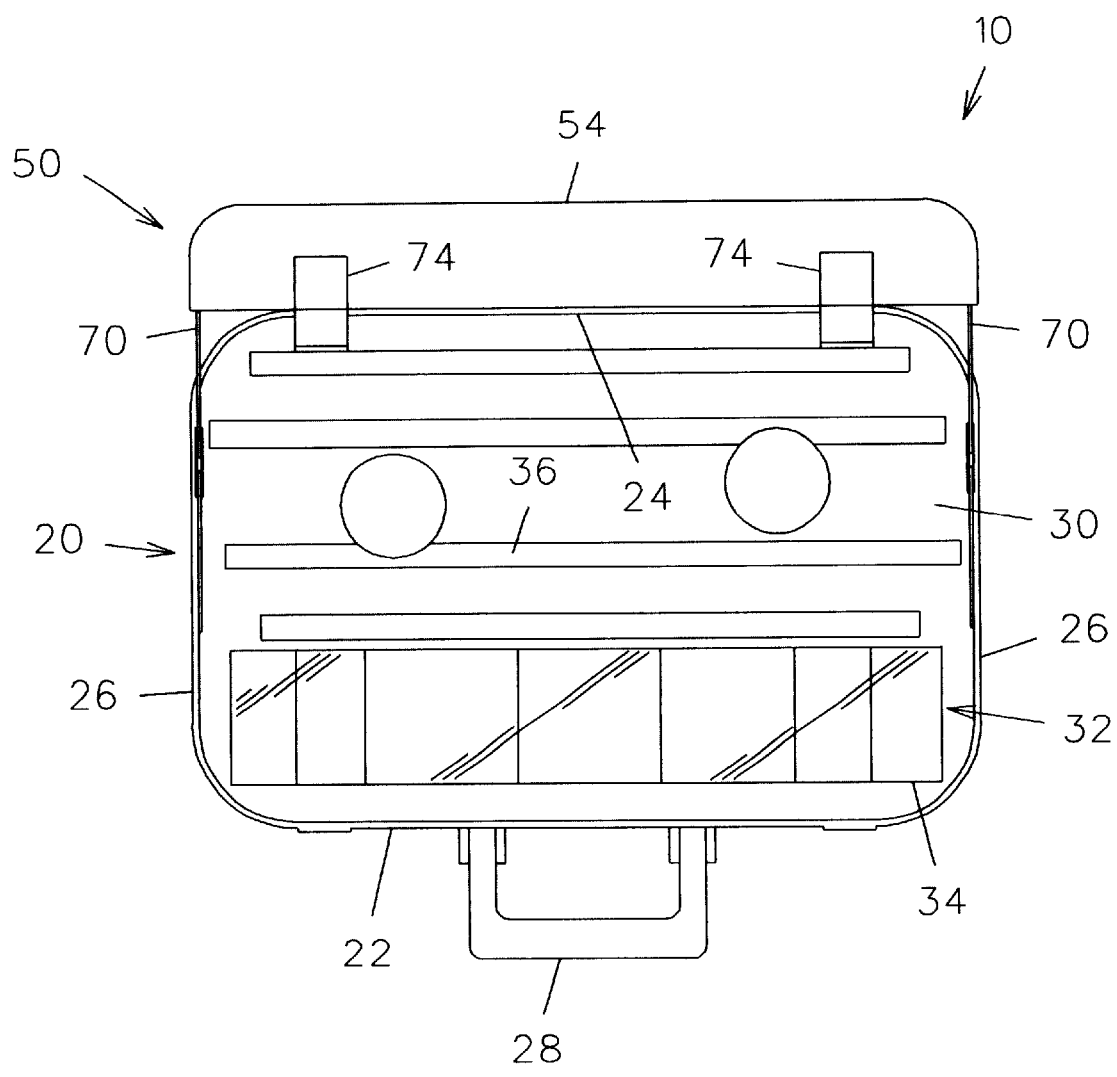
FIG. 2 is a top view of the case as in FIG. 1.
Figure 3:
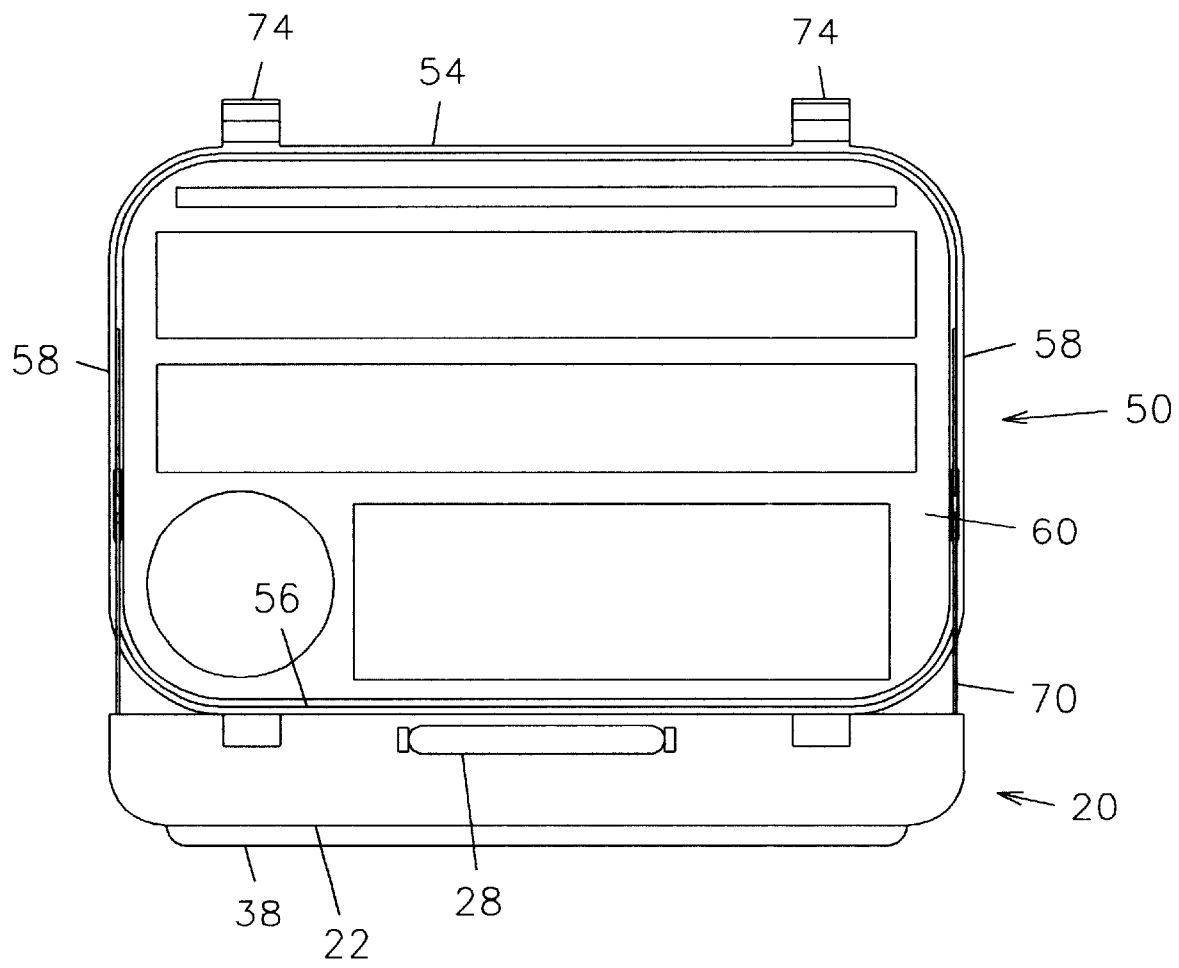
FIG. 3 is a front view of the case as in FIG. 1.
Figure 4:
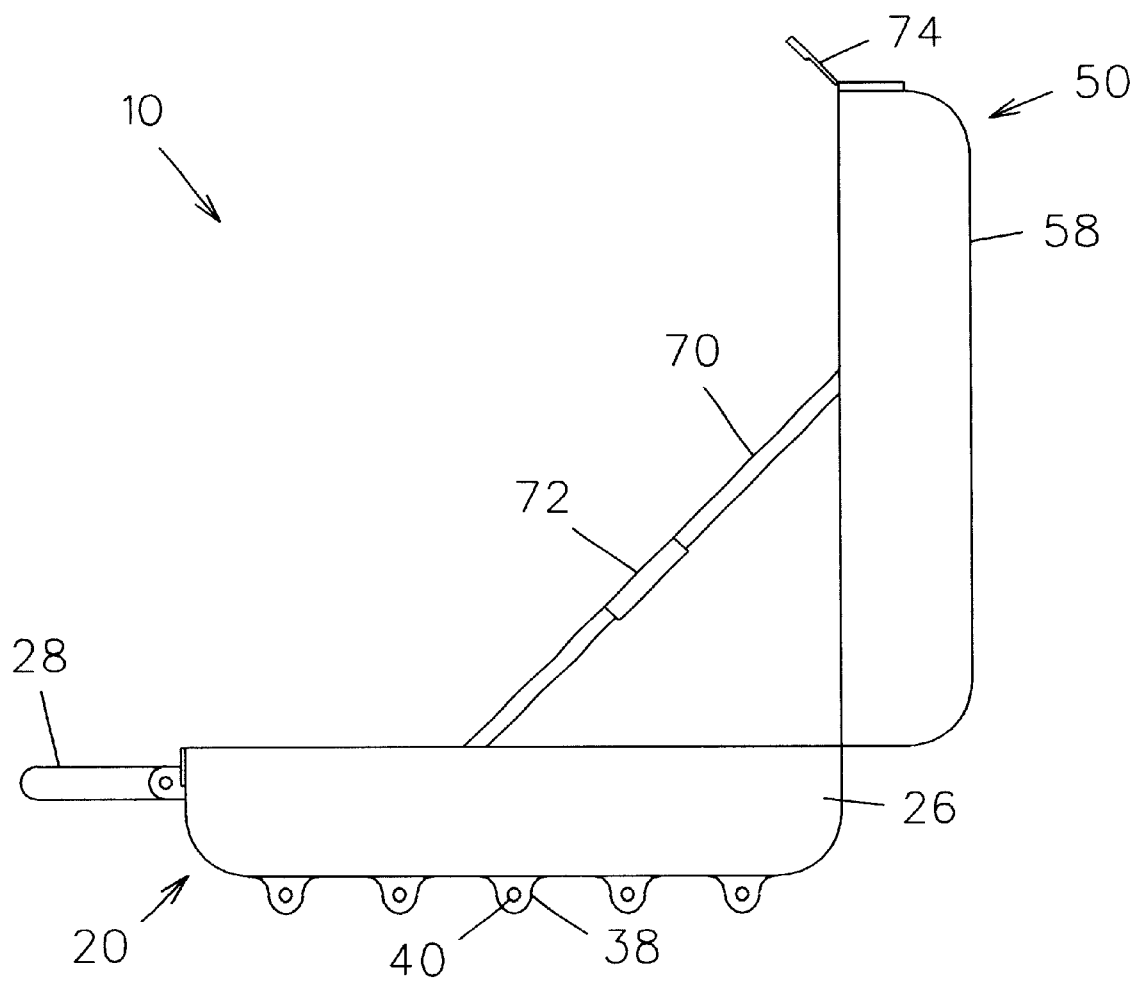
FIG. 4 is a side view of the case as in FIG. 1.

The case 10 includes a top portion 50 pivotally coupled to a bottom portion 20 (FIG. 1) with hinges (not shown). The top 50 and bottom 20 portions are constructed of aluminum although another sturdy material such as fiberglass or vinyl composite may be utilized. The bottom portion 20 includes a generally rectangular bottom panel having upwardly extending front 22 and rear 24 walls with upwardly extending end walls 26 extending therebetween. A handle 28 is pivotally mounted to an outer surface of the front wall 22 of the bottom portion 20. Therefore, the walls of the bottom portion 20 form a cavity which is substantially filled with an insert 30 constructed of a foam material such as foam rubber. The foam insert 30 fits tightly within the bottom portion cavity and defines a plurality of compartments for storing ice fishing equipment and related tackle (FIG. 1). It is appreciated, however, that the compartments may be easily adapted and useful for the storage and transport of tackle other than that used for ice fishing. A series of tackle compartments 32 are adjacent the front wall 22 of the bottom portion 20 and are covered by a transparent lid 34 that is pivotally mounted to the foam insert 30. The insert 30 further defines longitudinally extending cutouts 36 suitable for storage of ice fishing equipment such as jig poles or the like. The compartments 32 and cutouts 36 extend completely through the insert such that water therefrom may accumulate in the bottom portion cavity for drainage therefrom, as to be further described below.

The bottom portion 20 further includes a plurality of channels 38 or ribs. Each channel 38 includes a tubular construction having opposing end walls and defining an aperture 40 through each end wall (FIG. 1). Each channel 38 is in fluid communication with the bottom portion cavity such that water from fishing equipment and tackle may accumulate therein and drain through the apertures 40.

The top portion 50 is constructed in a manner substantially similar to the bottom portion 20. More particularly, the top portion 50 includes a top panel 52 (FIG. 5) having downwardly extending front 54 and rear 56 walls with downwardly extending end walls 58 therebetween. Therefore, the walls of the top portion 50 form a cavity which is substantially filled with an insert 60 constructed of a foam material. The foam insert 60 fits tightly within the top portion cavity and defines a plurality of compartments for storing ice fishing equipment and related tackle (FIG. 1). The compartments or spaces in the top portion insert 60 are generally larger than those of the bottom portion insert and are therefore suitable for larger pieces of ice fishing equipment, such as a tip-up apparatus.

Figure 5:
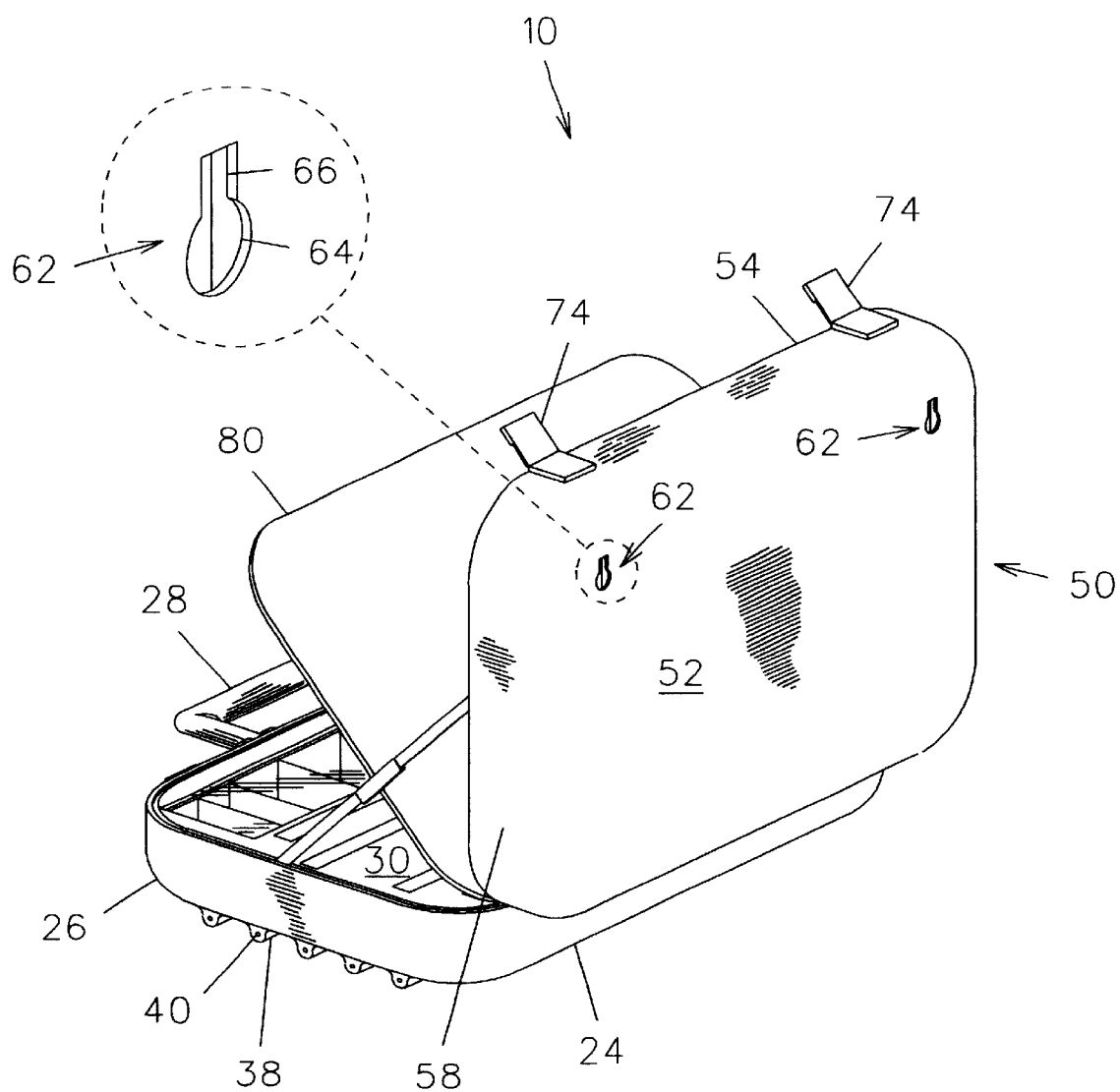
FIG. 5 is a rear perspective view of the case as in FIG. 1.

The outer surface of the top panel 52 defines a pair of spaced apart recesses 62, each recess having a first circular portion 64 and a more narrow rectangular portion 66 extending upwardly from the circular portion 64 (FIG. 5). The recesses 62 are configured so as to mate with conventional wall mounting means such as nails, screws, or the like. Alternatively, a pair of spaced apart mounting brackets 68 may be fixedly attached to the outer surface of the top panel 52 and extend therefrom (FIG. 8a). Each bracket 68 presents an inverted U-shaped configuration suitable for hanging upon conventional mounting means such as nails, screws, or the like (FIG. 8c).

A pair of spreader braces 70 include opposing ends that are attached to inner surfaces of the end walls 58, 26 of the top 50 and bottom 20 portions, respectively, of the case. Each spreader brace 70 includes a pair of arms pivotally connected together with a coupling 72 intermediate the ends of a respective spreader brace 70. The coupling 72 operates in a conventional manner to allow the arms of each spreader brace 70 to collapse for selectively moving the top 50 and bottom 20 portions between open and closed configurations.

The top portion 50 further includes a pair of spaced apart snap-type latches 74 fixedly attached to the outer surface of the front wall 54 thereof although it is understood that any suitable latch may be used. Receiving portions of the latches 74 are mounted on the outer surface of the front wall 22 of the bottom portion 20.

Figure 6:
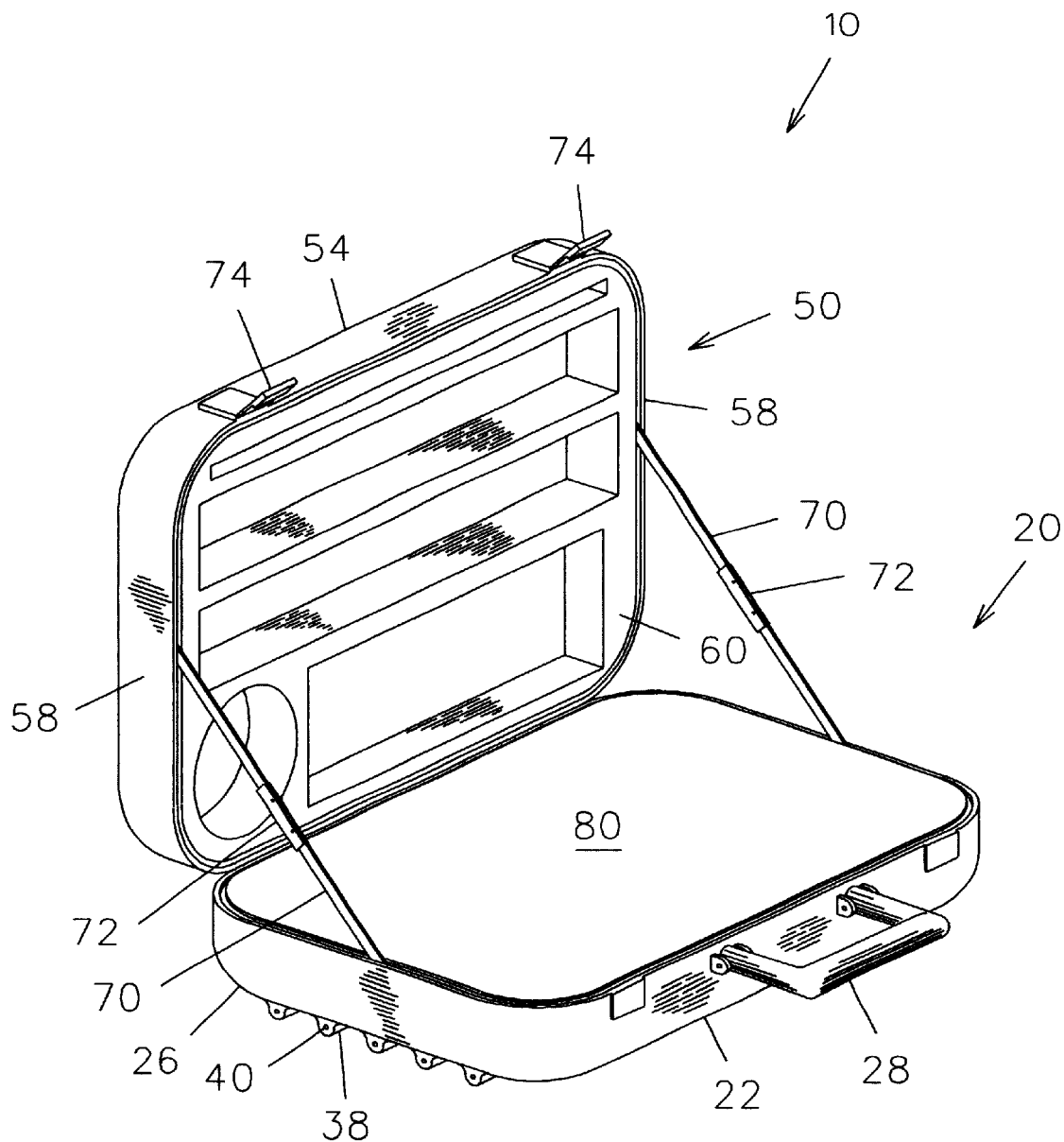
FIG. 6 is a perspective view of a case with a partition in a first position.
Figure 7:
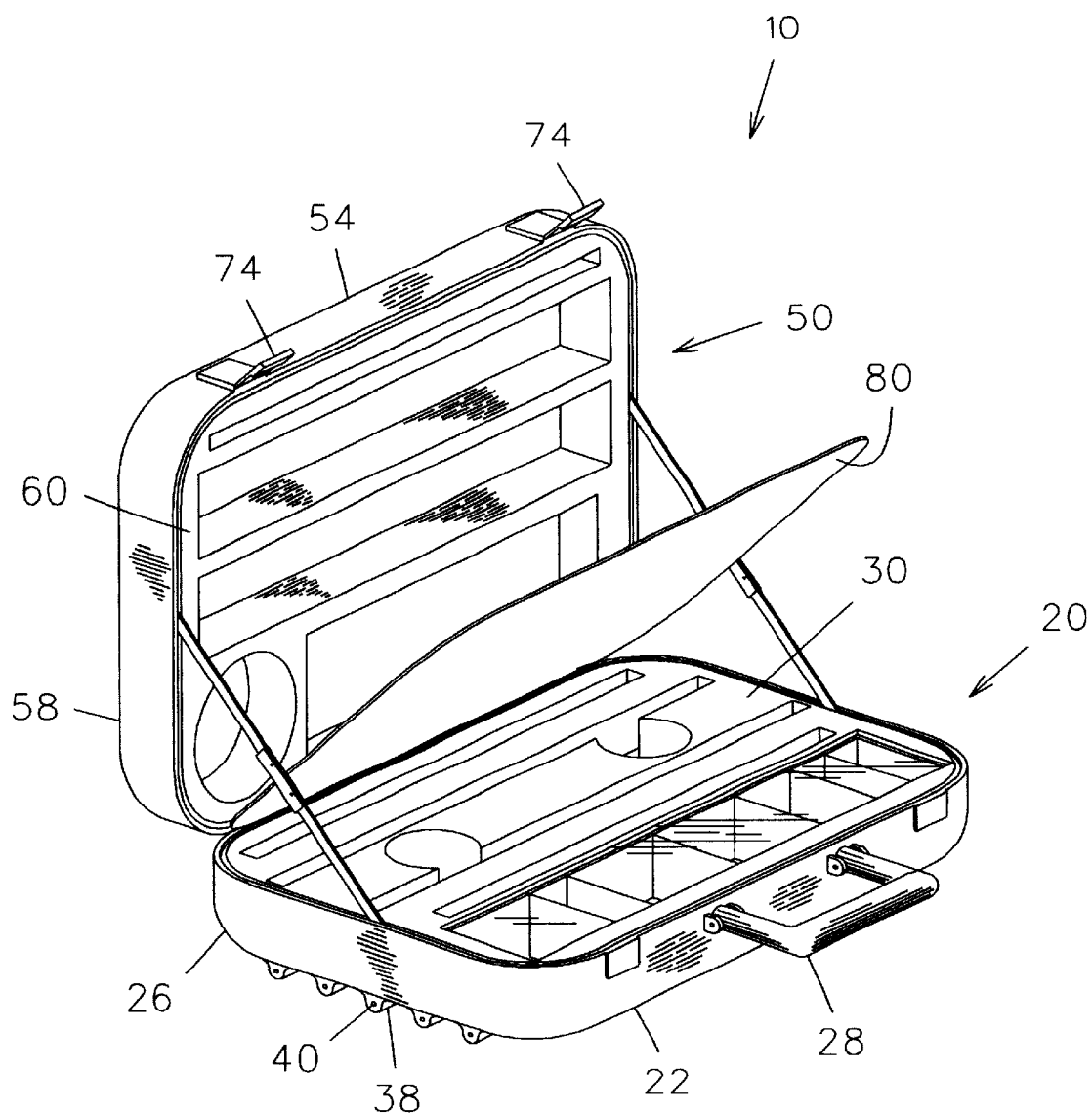
FIG. 7 is a perspective view as in FIG. 6 with the partition between first and second positions.

As shown in FIGS. 6 and 7, a generally rectangular partition 80 constructed of a rigid plastic material is pivotally coupled to the free edges of the rear walls 24, 56 of the bottom 20 and top 50 portions of the case 10. It is understood that the top portion 50, bottom portion 20 and partition 80 may all be pivotally connected with an integrally formed hinge as is known in the art for many tool cases. Therefore, the partition 80 is pivotal between a first position parallel to the bottom portion 20 and seated upon the bottom portion insert 30 and a second position parallel to the top portion 50 and seated upon the top portion insert 60. The peripheral edges of the partition 80 are adjacent the free edges of the upwardly extending walls of the bottom portion 20 in the first position (FIG. 6) whereas the peripheral edges of the partition are adjacent the free edges of the downwardly extending walls of the top portion 50 in the second position. In the FIG. 6 position, the partition 80 operates as a sturdy work surface, especially when the case 10 is mounted at a desired elevation on a wall. The partition 80 may be selectively snappably held in the first and second positions and may include a rubber gasket (not shown) about its peripheral edges for further precluding the passage of water between top 50 and bottom 20 portions.

In operation, ice fishing equipment such as a tip-up and jig pole along with related tackle may be placed in the various compartments and cut-outs of the top and bottom portion foam inserts 30, 60. As the equipment is inserted into the intentionally narrow spaces, the foam material may be made to momentarily expand so as to establish a friction fit gripping configuration. While in a closed configuration, the case 10 may be carried by its handle to a fishing location such as an ice fishing shack atop the frozen surface of a body of water. The case 10 may be mounted to a wall of the shack by mating the recesses 62 with traditional mounting means extending from the wall at a desired distance from the ground or ice surface. Once mounted, the case 10 may be opened by releasing the latches 74 and allowing the bottom portion 20 to extend to a level position. The partition 80, when pivotally placed in the FIG. 6 position may then serve as a work surface while preparing the equipment for fishing or for processing a caught fish. When finished fishing, a user may replace the equipment and tackle into the foam inserts 30, 60 and latch the case 10 in its closed configuration. The case 10 may be left mounted to the wall for storage or removed for carrying.

It is understood that while certain forms of this invention have been illustrated and described, it is not limited thereto except insofar as such limitations are included in the following claims and allowable functional equivalents thereof.

Having thus described the invention, what is claimed as new and desired to be secured by Letters Patent is as follows:

1. A case for storing and carrying ice fishing equipment and related tackle, comprising:
   a generally rectangular bottom portion having a bottom panel, upwardly extending front and rear walls, and a pair of upwardly extending end walls defining a bottom portion cavity;
   a generally rectangular top portion having a top panel, downwardly extending front and rear walls, and a pair of downwardly extending end walls defining a top portion cavity, said rear wall of said top portion pivotally coupled to said rear wall of said bottom portion such that said top portion is selectively movable between open and closed configurations;
   a partition pivotally mounted between said top and bottom portions and movable between a first position parallel to said bottom portion and a second position parallel to said top portion when said top portion is at said open configuration;
   a first foam insert disposed in and substantially filling said bottom portion cavity and a second foam insert disposed in and substantially filling said top portion cavity, said first and second inserts having a generally flat upper surface defining a plurality of compartments adapted to receive fishing equipment and related tackle therein;
   a transparent lid pivotally coupled to said first insert for selectively covering a predetermined number of said plurality of compartments formed in said first insert;
   a pair of spaced apart mounting brackets fixedly attached to an exterior surface of said top panel, said brackets adapted to be coupled to respective mounting flanges extending from a wall; and
   a plurality of tubular channels extending longitudinally along an exterior surface of said bottom panel and being spaced apart in a ribbed configuration, each channel being in communication with respective said compartments for collecting water accumulated within said bottom cavity, each channel defining at least one opening for draining water accumulated within said channel.

2. A case as in claim 1 wherein said partition is a generally rectangular panel having a configuration substantially similar to that of said bottom and top panels and adapted to be seated upon said first or second insert when said partition is at said first or second position, respectively.

3. A case as in claim 1 wherein said partition is constructed of a rigid plastic material whereby to provide a work surface at said first partition position.

4. A case for storing and carrying ice fishing equipment and related tackle, comprising:

a generally rectangular bottom portion having a bottom panel, upwardly extending front and rear walls, and a pair of upwardly extending end walls defining a bottom portion cavity;

a generally rectangular top portion having a top panel, downwardly extending front and rear walls, and a pair of downwardly extending end walls defining a top portion cavity, said rear wall of said top portion pivotally coupled to said rear wall of said bottom portion such that said top portion is selectively movable between open and closed configurations;

a partition pivotally mounted between said top and bottom portions and movable between a first position parallel to said bottom portion and a second position parallel to said top portion when said top portion is at said open configuration;

a pair of spaced apart mounting brackets fixedly attached to an exterior surface of said top panel, said brackets adapted to be coupled to respective mounting flanges extending from a wall;

a first foam insert disposed in and substantially filling said bottom portion cavity and a second foam insert disposed in and substantially filling said top portion cavity, said first and second inserts having a generally flat upper surface defining a plurality of compartments adapted to receive fishing equipment and related tackle therein; and a plurality of tubular channels extending longitudinally along an exterior surface of said bottom panel and being spaced apart in a ribbed configuration, each channel being in communication with respective said compartments for collecting water accumulated within said bottom cavity, each channel defining at least one opening for draining water accumulated within said channel.

5. A case as in claim 4 wherein said mounting means includes a pair of spaced apart recesses formed inwardly by an exterior surface of said top panel and adapted to mate with respective mounting flanges extending from said wall.

6. A case as in claim 4 wherein said partition is formed of a rigid plastic material whereby to provide a work surface at said first partition position.

* * * * *